US007039518B2

(12) United States Patent
Ingram et al.

(10) Patent No.: US 7,039,518 B2
(45) Date of Patent: May 2, 2006

(54) COMPUTER METHOD AND APPARATUS FOR AIRCRAFT MIXTURE LEANING

(75) Inventors: Michael J. Ingram, Melbourne, FL (US); Simon J. Matthews, Indialantic, FL (US); James J. Squadrito, Ipswich, MA (US)

(73) Assignee: Avidyne Corporation, Lincoln, MA (US)

( * ) Notice: Subject to any disclaimer, the term of this patent is extended or adjusted under 35 U.S.C. 154(b) by 0 days.

(21) Appl. No.: 10/824,769

(22) Filed: Apr. 14, 2004

(65) Prior Publication Data

US 2005/0137778 A1 Jun. 23, 2005

Related U.S. Application Data

(60) Provisional application No. 60/463,507, filed on Apr. 16, 2003.

(51) Int. Cl.
*B60T 7/12* (2006.01)

(52) U.S. Cl. .......................... 701/103; 701/3; 701/102; 701/115; 123/676

(58) Field of Classification Search ................ 701/103, 701/102, 104, 115, 3; 123/676, 435, 674
See application file for complete search history.

(56) References Cited

U.S. PATENT DOCUMENTS

| | | | | |
|---|---|---|---|---|
| 4,452,207 | A | 6/1984 | Moore, Jr. | |
| 5,941,222 | A * | 8/1999 | Braly | 123/676 |
| 6,556,902 | B1 | 4/2003 | Ing et al. | |
| 6,842,672 | B1 * | 1/2005 | Straub et al. | 701/3 |
| 2003/0193411 | A1 | 10/2003 | Price | |

OTHER PUBLICATIONS

Braly, G. W., "Wright Aeronautical Division (WAD) Recommended Leaning Procedure: Back to the Future: Part I,", General Aviation Modifications, Inc., [online], Apr. 1999 [retrieved on May 14, 2004], Retrieved from the Internet, <URL: http://web.archive.org/web/19991009014834/http://www.gami.com/future.html.>.

Braly, G. W., "Wright Aeronautical Division (WAD) Recommended Leaning proceudre: Back to the Future: Part II,", General Aviation Modifications, Inc., [online], Jun. 2000 [retrieved on May 14, 2004]. Retrieved from the Internet, <URL: http://web.archive.org/web/20000611002630/www.gami.com/bttf2.html.>.

Braly, G. W., "Wright Aeronautical Division (WAD) Recommended Leaning Procedure: Back to the Future: Part III,", General Aviation Modifications, Inc., [online], Jan. 2000 [retrieved on May 14, 2004]. Retrieved from the Internet, <URL: http://web.archive.org/web/20010112175800/http://www.gami.com/bttf3.html.>.

(Continued)

*Primary Examiner*—Willis R. Wolfe
*Assistant Examiner*—Johnny H. Hoang
(74) *Attorney, Agent, or Firm*—Hamilton, Brook, Smith & Reynolds, P.C.

(57) ABSTRACT

A computer implemented lean assist function monitors exhaust gas temperature in a plurality of cylinders in an engine along with fuel flow. The lean assist function automatically detects whether the pilot is leaning for best power or best economy and provides an indication to the pilot when the desired fuel mixture has been achieved based on the monitored temperatures.

21 Claims, 7 Drawing Sheets

OTHER PUBLICATIONS

Deakin, J., "Pelican's Perch #15: Manifold Pressure Sucks!," *AVweb*, [online], Mar. 1999 [retrieved on May 14, 2004]. Retrieved from the Internet, <URL: http://www.avweb.com/<URL:www.avweb.com/news/columns/182081-1.html>.

Deakin, J., "Pelicans's Perch #16: Those Marvelous Props," *AVweb*, [online], Apr. 1999 [retrieved on May 14, 2004]. Retrieved from the Internet, <URL: www.avweb.com/news/columns/182082.html>.

Deakin, J., "Pelican's Perch #18: Mixture Magic," *AVweb*, [online], Jun. 1999 [retrieved on May 14, 2004]. Retrieved from the Internet, <URL: www.avweb.com/news/columns/182084-1.html>.

Deakin, J., "Pelican's Perch #19: Putting It All Together," *Avweb*, [online], Jun. 1999 [retrieved on Mar. 18, 2004]. Retrieved from the Internet, <URL: www.avweb.com/news/columns/182085-1.html>.

J.P. Instruments, Inc., "Pilot's Guide: Engine Data Management EDM-700, EDM-800," J.P Instruments, Inc., pp. 1-64 (2001).

"FlightMax EX5000C, FlightMax EX3000C Multi-Function Displays, Pilot's Guide for the Cirrus SR 20 & SR 22", (Brochure), P/N 600-00072 Rev 05 08/02, (© 2002 Avidyne Corporation).

* cited by examiner

COMPUTER METHOD AND APPARATUS FOR AIRCRAFT MIXTURE LEANING

RELATED APPLICATIONS

This application claims the benefit of U.S. Provisional Application No. 60/463,507, filed on Apr. 16, 2003. The entire teachings of the above application are incorporated herein by reference.

BACKGROUND OF THE INVENTION

Exhaust Gas Temperature (EGT) and fuel flow of an engine are used by a pilot of an aircraft during cruise flight to conserve fuel and extend range. The pilot monitors the temperature of the exhaust gas output from cylinders in the engine while adjusting fuel flow.

For best power, the pilot uses the first cylinder to reach a peak EGT when reducing fuel flow (the leanest cylinder) as a reference. Having determined the first cylinder to reach a peak EGT, the pilot increases fuel flow until the EGT in that cylinder decreases to within a predefined range of the detected first cylinder peak (rich of peak).

Automated systems to aid the pilot in achieving best power are available. One such automated system is JP Instrument's Engine Data Management 900 (EDM-900). The EDM-900 automatically detects the first cylinder to reach a peak EGT when leaning and displays the peak EGT on the display allowing the pilot to monitor the decrease in EGT while increasing fuel flow.

For best economy, the pilot continues to reduce fuel flow and monitor the EGTs of the other cylinders until the last cylinder reaches a peak EGT. The pilot continues to reduce the fuel flow until the EGT of the last cylinder to reach a peak EGT decreases to within a predefined range of the last cylinder's peak EGT (lean of peak).

This complicated process (known as engine fuel mixture leaning) requires monitoring exhaust gas temperatures and computing lean and rich of peak values and must be recomputed each time there is a change in altitude or power lever position. Thus, due to the complicated procedure many pilots do not lean the fuel flow mixture to the respective aircraft engine resulting in use of more fuel than necessary. Other pilots decide on an arbitrary power setting with no attempt to achieve best power of the aircraft engine.

SUMMARY OF THE INVENTION

In the present invention, Multi Function Display System (MFD) with engine instruments takes advantage of temperature data from all cylinders for Best Power and Best Economy indication. A Lean Assist function (that is, a computer executed routine) in the Multi Function Display System aids a pilot in operating an aircraft engine more accurately and economically than previously available.

The Lean Assist function provides a method for setting an optimum fuel flow for an engine. Upon receiving a request for setting the optimum fuel flow, an increase in exhaust gas temperature in a plurality of cylinders in the engine is monitored as fuel flow is decreased. Upon detecting a first peak temperature in a first cylinder, the first cylinder is identified on a display that shows a graphical representation of measured exhaust gas temperature for each cylinder in the engine. The exhaust gas temperature is monitored to detect subsequent peak temperatures. The exhaust gas temperatures are monitored dependent on fuel flow after the first cylinder has been identified. An indication is provided on the display that optimum fuel flow has been reached.

Upon detecting an increase in the fuel flow after identifying the first cylinder, the exhaust gas temperature of the first cylinder is monitored. Upon detecting that the exhaust gas temperature in the first cylinder has reached a second peak temperature, the exhaust gas temperature of the first cylinder is monitored until the exhaust gas temperature is below a temperature range of the second peak temperature. An indication is provided on the display that the fuel flow for best power has been reached.

The temperature range is within best power limits of the engine below the second peak temperature. Upon detecting that the exhaust gas temperature is below an upper best power limit temperature of the second peak temperature, an indication is provided on the display that the fuel flow is rich of peak.

Upon detecting a decrease in the fuel flow after identifying the first cylinder, the exhaust gas temperature of the other cylinders is monitored. Upon detecting that the exhaust gas temperature in a last cylinder has reached a last peak temperature, the exhaust gas temperature of the last cylinder is monitored until the exhaust gas temperature is below a temperature range of the last peak temperature. An indication is provided on the display that the fuel flow for best economy has been reached.

The temperature range is within best economy limits of the engine below the last cylinder peak temperature. Upon detecting that the exhaust gas temperature is below a lower best economy limit of the last cylinder peak temperature, an indication is provided on the display that the fuel flow is too lean.

The display may include a numeric representation of the exhaust gas temperature for each cylinder. The resolution of the numeric representation may be one degree Fahrenheit.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
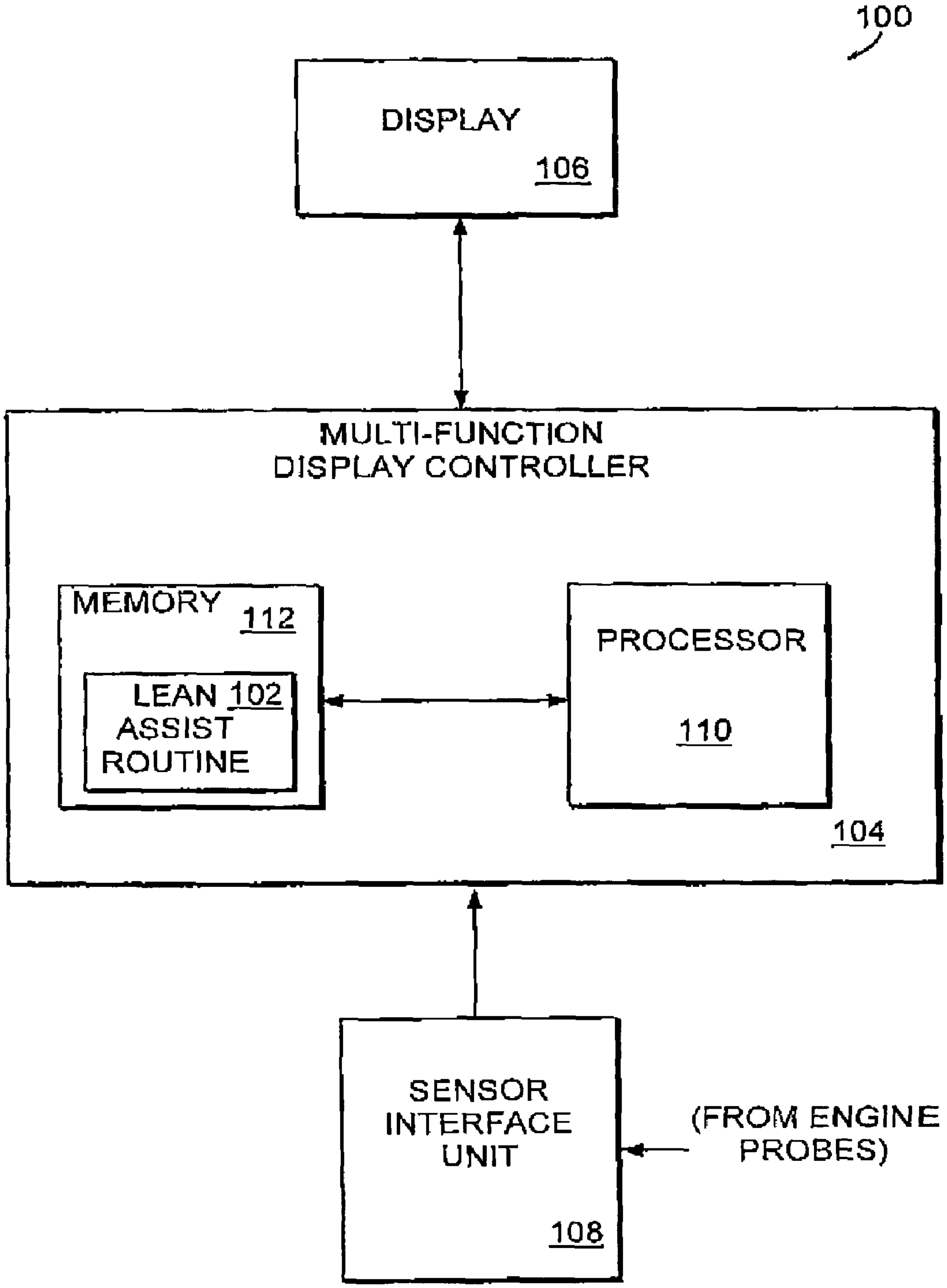
FIG. 1 is a block diagram of a Multi Function Display System including a lean assist routine according to the principles of the present invention.

A description of preferred embodiments of the invention follows. FIG. 1 is a block diagram of a Multi Function Display System 100 including a lean assist routine 102 according to the principles of the present invention. The Multi Function Display System (MFD) 100 includes a controller 104, display 106 and a sensor interface unit (SIU) 108. The controller 104 includes a processor 110 and memory 112 for processing measured engine parameters received by the sensor interface unit 108. The controller 104 controls display of the engine parameters on the display 106.

The Multi-Function Display system 100 monitors a piston engine to assist the pilot in managing the fuel-air mixture supplied to the engine. The piston engine is an internal combustion engine that is typically used by small aircraft to convert fuel into motion. An internal combustion engine burns fuel that is mixed with air in an enclosed combustion chamber (a cylinder) which is integral to the engine. The engine's power is generated by a force exerted on a piston by the expansion of gases resulting from combustion of a fuel-air mixture. The piston is a cylindrical piece of metal that moves up and down inside the cylinder. The force exerted on the piston moves the piston back and forth in the cylinder.

One complete movement of the piston forward or backward in the cylinder is called a stroke. Typically, a piston engine has a four-stroke combustion cycle. The first stroke, a downward motion of the piston, typically referred to as the intake stroke draws the fuel-air mixture into the cylinder. The second stroke, the upward motion of the piston raises the pressure and temperature of the mixture. The third stoke, the downward motion of the piston is caused by the expansion of the fuel-air mixture as the mixture burns. The fourth stroke, the upward motion of the piston, referred to as the exhaust stroke, pushes the burned gases (exhaust gases) out of the engine.

The fuel-air mixture varies with altitude because the level of oxygen in the air decreases. If the same fuel is delivered to the combustion chamber with less oxygen being supplied, the fuel-mixture is referred to as "rich" because all of the fuel in the fuel-air mixture is not being burned in the combustion chamber. The unused fuel is released with the exhaust gases. As the fuel-air mixture gets richer, the power decreases because the engine cannot burn the excess fuel in the fuel-air mixture. The engine cools as the power decreases and the exhaust gas temperature and cylinder head temperature drop accordingly. The process for controlling the ratio of fuel to air in the fuel-air mixture is referred to as leaning. The mixture is leaned by reducing the percentage of fuel in the mixture and enriched by increasing the percentage of fuel in the mixture.

Typically, a mixture range from about 5% to 12.5% fuel by weight supports combustion. With less fuel, the mixture is too lean to burn and with more fuel the mixture is too rich to burn. One mixture range commonly referred to as the "best power" mixture provides the maximum power. Another mixture range, commonly referred to the "best economy" mixture provides less than the maximum power, but the most power per gallon of fuel.

In one embodiment, the piston engine is a six cylinder fuel injected air cooled engine, for example, piston engines manufactured by Teledyne Continental Motors such as Model Number IO-360-ES or Model Number IO-550-N. In a fuel injected engine, the fuel is injected individually into each cylinder. However, the invention is not limited to these particular six cylinder engines. The invention can be used for any piston engine, irrespective of the number of cylinders or type of engine.

Each cylinder in the engine has an Exhaust Gas Temperature (EGT) probe that measures temperature of the exhaust gas output from the cylinder and a Cylinder Head Temperature (CHT) probe that monitors temperature of the cylinder. In a preferred embodiment, the MFD 100 acquires the temperature sensor data through the sensor interface unit 108 at a rate of 5 Hz with a resolution of 12 bits (4096 levels). The EGT and Fuel Flow (FF) data are useful to the pilot operating the aircraft engine during cruise flight to conserve fuel and extend range.

Figure 2:
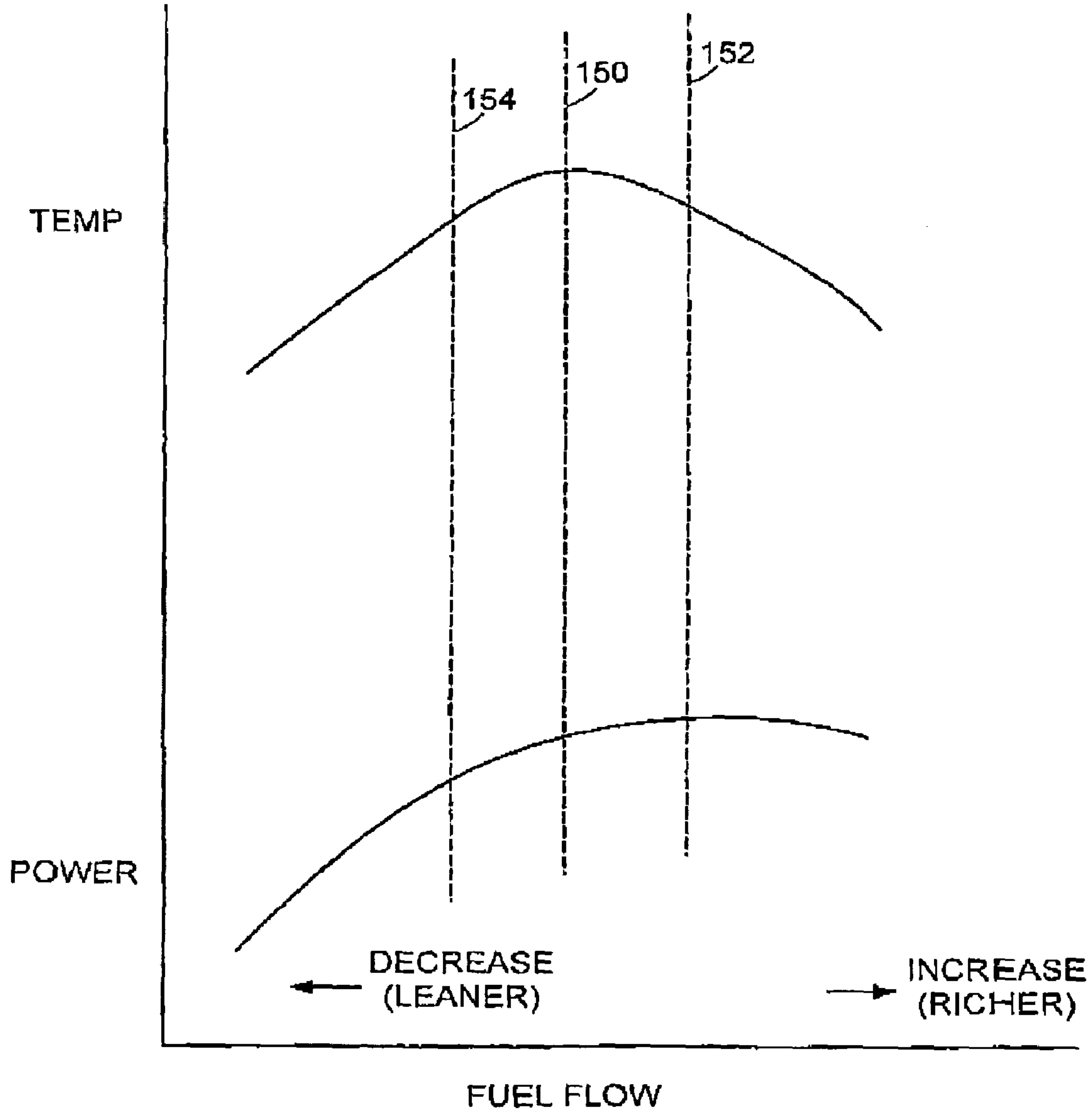
FIG. 2 is a graph illustrating the relationship between power and EGT with respect to fuel flow in one cylinder in an engine.

FIG. 2 is a graph illustrating the relationship between power and exhaust gas temperature with respect to fuel flow in one cylinder in an engine. As shown, as the fuel flow to the cylinder is increased, the exhaust gas temperature reaches a peak temperature at 150. The exhaust gas temperatures decrease from the peak temperature as the fuel flow is increased. To set the fuel flow for best power, more fuel is added to the mixture after the exhaust gas temperature reaches the peak exhaust gas temperature, until the exhaust gas temperature reaches a temperature that is within a best power limit below the peak exhaust gas temperature. At 152, the fuel flow is set for best power with the fuel flow set for "rich of the peak". As shown in FIG. 2, the power at point 152 (best power) is greater than the power at the peak temperature.

To set the fuel flow for best economy, the fuel flow is decreased after the EGT has reached the peak temperature 150 until the exhaust gas temperature reaches a temperature that is within a best economy limit below the peak exhaust gas temperature. At point 154, the fuel flow is set for best economy with the exhaust gas temperatures set for "lean of peak". As shown in FIG. 2, the power at point 154 (best economy) is less than the power at the peak temperature.

Thus, the exhaust gas temperature (EGT) in each cylinder is used to set the fuel flow for best power (rich of peak) and best economy (lean of peak). The EGT is typically used as an aid for mixture leaning in cruising flight at 75% power or less.

The best power limit and best economy limit are specified by the engine manufacture. To adjust the mixture, the pilot leans (reduces the fuel flow) the fuel flow mixture to the engine to establish the peak EGT as a reference point and then adjusts the mixture by the desired increment based on Table 1 below:

TABLE 1

| Mixture Description | Exhaust Gas Temperature |
|---|---|
| Best Power | 75° F. Rich of Peak EGT |
| Best Economy | 25°–50° F. Lean of Peak EGT |

Thus, for best power, the pilot enriches the mixture (increases fuel flow) after the peak EGT is detected until the EGT temperature reaches within the best power limit for example, 75 ° F. Rich of Peak EGT and for best economy the pilot leans the mixture (decreases fuel flow) until the EGT temperature reaches within the best economy limit, for example, a temperature range between 25°–50° F. Lean of Peak EGT, where 50° F. is the upper best economy limit temperature and 25° F. is the lower best economy limit temperature.

Under some conditions, engine roughness may occur while operating at best economy. If this occurs, the pilot enriches the mixture as required to smooth engine operation. Any change in altitude or Power Lever position also requires a recheck of EGT indication.

Fuel Flow, Minimum Allowable is defined for three conditions of power output (75%, 65% and 55%) for the TCM Model Number 10–550-N engine and listed in Table 2 below. As shown in Table 2, for best economy at 75%, the minimum allowable fuel flow is 14 gallons per hour or 82 lb per hour. For best power at 75%, the minimum allowable fuel flow is 16.7 gallons per hour. Note: Density for aviation gasoline is 5.87 LB/GAL.

TABLE 2

| | Fuel Flow GPH (LB/H) | |
|---|---|---|
| % Power | Best Economy | Best Power |
| 75% | 14.0 (82) | 16.7 (98) |
| 65% | 12.3 (72) | 15.0 (88) |
| 55% | 10.7 (63) | 13.2 (78) |

Table 3 lists minimum allowable fuel flow for four conditions of power output (75%, 65%, 55% and 45% for the TCM Model Number 10-360ES engine.

TABLE 3

| | Fuel Flow GPH (LB/H) | | |
|---|---|---|---|
| % Power | Best Econ | Peak EGT | Best Power |
| 75% | 10.2 (60) | 10.6 (62) | 12.1 (71) |
| 65% | 9.02 (53) | 9.5 (56) | 10.9 (64) |
| 55% | 8.0 (47) | 8.3 (49) | 9.9 (58) |
| 45% | 6.9 (41) | 7.3 (43) | 8.7 (51) |

Returning to FIG. 1, the lean assist routine 102 is used to set the optimum fuel flow for various operating conditions by aiding the pilot in attaining two expected engine lean operating objectives: Best Power and Best Economy. The lean assist routine 102 is a computer implemented routine that automatically detects whether a pilot is leaning for best power or best economy and provides visual messages on the display 106 to guide the pilot toward the correct fuel flow setting. The Lean Assist function 102 is a state machine that monitors peak states of each of the six EGT Data Sources, along with Fuel Flow, in order to assist the pilot with the leaning procedure. The Lean Assist function 102 monitors the EGT of each cylinder in the engine and provides the ability to automatically switch between optimum fuel level for "best economy" and "best power based on whether the pilot is "leaning" or "enriching".

Figure 3:
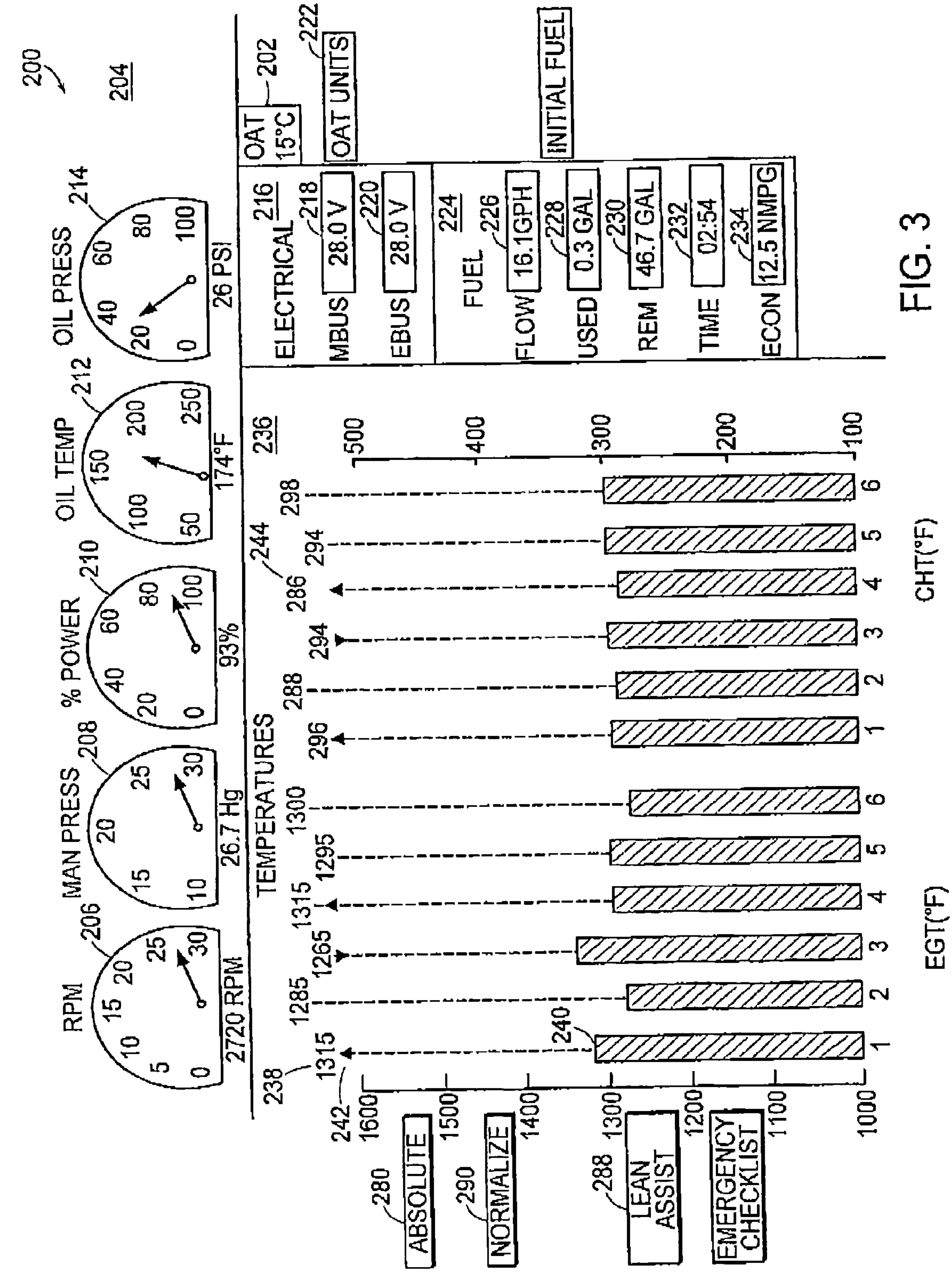
FIG. 3 illustrates an engine page (screen view) displayed on the display Multi Function Display System of FIG. 1.

FIG. 3 illustrates an engine page 200 (screen view) displayed on the display 106 of the Multi Function Display System 100 of FIG. 1. The engine page 200 provides indications of engine cylinder temperatures, pressures, fuel flow and electrical voltage and current to a pilot.

The Engine page 200 is used to display the health and performance status of the aircraft engine. Most of the engine indications are transmitted to the MFD 100 via a remotely mounted Sensor Interface Unit (SIU) 108 (FIG. 1) while the remainder are calculated by the processor 110 in the MFD 100.

The Engine page 200 is divided into four main sections plus an Outside Air Temperature (OAT) gauge 202. In the temperature Section 236 of engine page 200, Exhaust Gas Temperature (EGT) indicates the exhaust gas temperature of each cylinder in degrees Fahrenheit as a bar graph. The individual EGT of each cylinder is also displayed as a numeric indication 238 above each bar 240. An up or down trend arrow 242 also appears below this numeric indication 238 to indicate whether a cylinder's EGT is rising or falling. Initially all bars are the same color. In the embodiment shown, all bars are initialized to green. These indications are reported by the SIU 108 and in combination with the Lean Assist function 102 (FIG. 1) are used to aid the pilot in leaning the aircraft's engine for desired performance.

Cylinder Head Temperature (CHT) indicates the temperature in degrees Fahrenheit of each engine cylinder head as reported by the SIU 108. The individual temperature of each cylinder is also displayed as a numeric indication 244 above each bar. An up or down trend arrow 242 also appears above or below this numeric indication to indicate whether a cylinder is rising or falling in temperature.

"Absolute" button 280 selects the absolute mode for EGT display. Absolute mode is the default display mode, which indicates the current exhaust gas temperature for each cylinder. "Normalize" button 290 selects the normalize mode for the EGT display. Upon activation, the display establishes all of the current EGTs at a zero point. In EGT Normalized mode, the bar graph indicates overall changes in EGT rather than displaying the actual temperature values as in absolute mode.

The other sections are the fuel section 204, the gauge section 224 and the electrical section 216. The fuel section 224 provides Fuel Flow, Fuel Used, Fuel Remaining, Time Remaining, and Fuel Economy information. The fuel flow (flow) 226 displays the current fuel flow numerically in gallons per hour as reported by the SIU 108. The fuel used (used) 228 displays the total amount of fuel used since the last engine start as reported by the SIU 108. The fuel remaining (rem) 230 displays the total amount of fuel remaining in gallons. This indication is calculated by the MFD 100 (controller 104) based on the starting fuel entered by the pilot on a fuel initialization page and fuel flow as reported by the SIU 108. The fuel time (time) 232 displays the amount of time remaining before the total useable fuel on board will be consumed. This indication is also calculated by the MFD controller 104 (FIG. 1) based on the setting from the fuel initialization page and fuel flow as reported by the SIU 108. Fuel economy (econ) 234 displays the current fuel economy in nautical miles per gallon. This indication is based on the fuel flow as reported by the SIU and the groundspeed as reported by the GPS. This value is only displayed when the GPS ground speed is greater than 50 knots. The Cylinder Temperatures section 236 includes a full display of Exhaust Gas Temperature (EGT) and Cylinder Head Temperature (CHT) for all six cylinders.

The gauge section 204 provides graphical and numeric readouts of Revolutions Per Minute (RPM) 206, Manifold Pressure 208, Percent Power 210, Oil Temperature 212 and Oil Pressure 214. The RPM gauge 206 displays current engine speed in revolutions per minute as reported by the SIU 108 (FIG. 1). The manifold pressure gauge 208 displays current engine pressure in inches of mercury as measured at the engine's induction system and reported by the SIU 108 (FIG. 1). The percent power gauge 210 indicates the current percent power being made by the engine. This indication is calculated by the MED based on engine RPM, manifold pressure, outside air temperature, and fuel flow. The Oil Temperature gauge 212 displays the current engine oil temperature in degrees Fahrenheit as reported by the SIU 108 (FIG. 1). The Oil Pressure gauge 214 displays indicated engine oil pressure in pounds per square inch (PSI) as reported by the SIU 108 (FIG. 1).

The electrical section 216 monitors the electrical bus. M. BUS 218 indicates the current voltage of the main bus in volts as reported by the SIU 108. E. BUS 220 indicates the current voltage of an essential bus in volts as reported by the SIU 108.

The Outside Air Temperature (OAT) section 202 displays the digital outside ambient air temperature (OAT) reading as reported by the SIU 108 (FIG. 1). This can be displayed in degrees Fahrenheit or degrees Celsius as selected by the pilot using the temperature units control 222.

Figure 4:
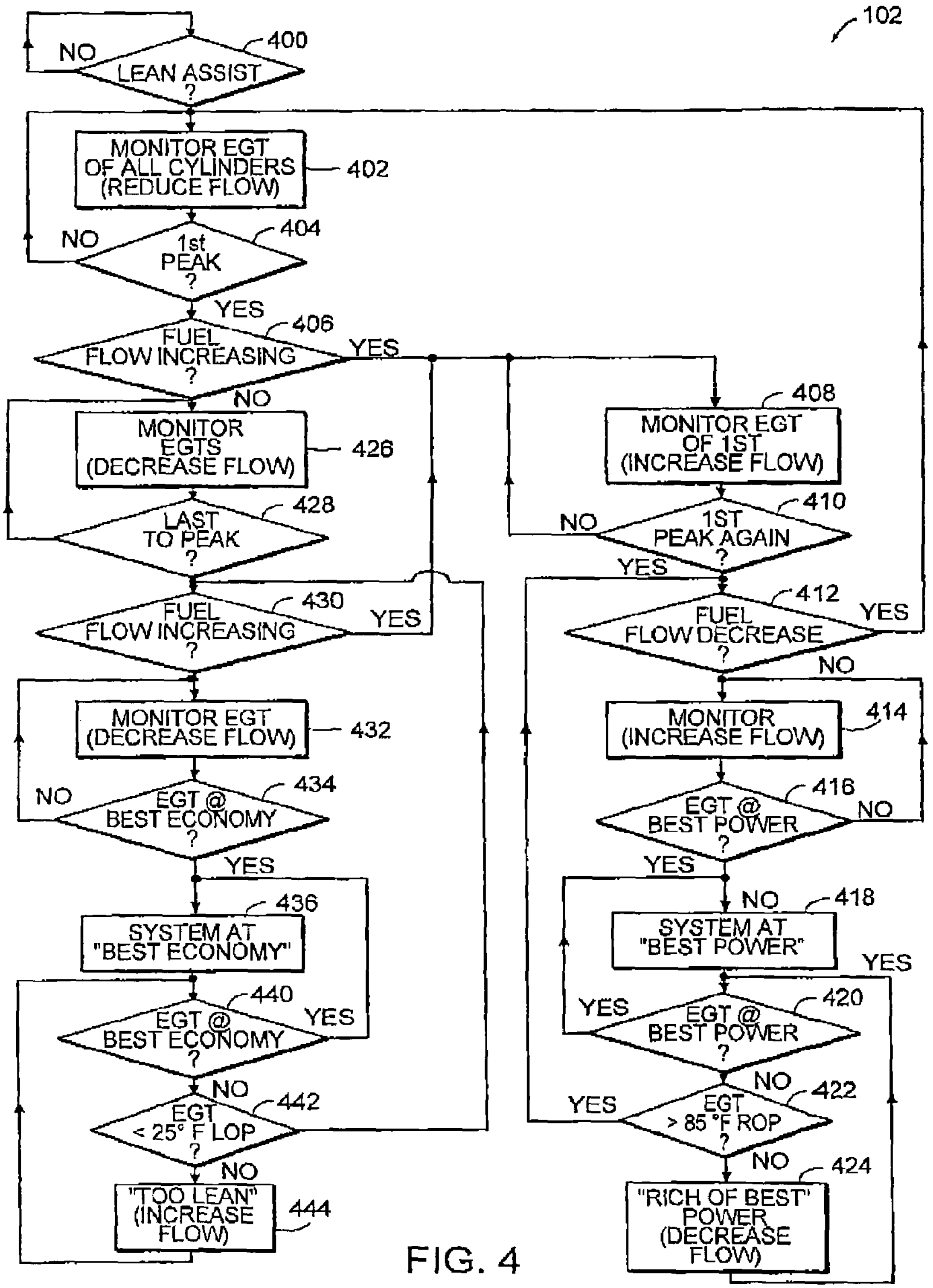
FIG. 4 is a flow chart illustrating the operation of the lean assist routine.

FIG. 4 is a flow chart illustrating the operation of the lean assist routine 102. The lean assist routine 102 is used to set the optimum fuel mixture for various operating conditions. The lean assist routine 102 automatically detects whether the pilot is leaning for best power or best economy and provides visual messages on the display 106 to guide the pilot toward the correct mixture setting.

For best power, the Lean Assist routine 102 uses the first cylinder to reach peak exhaust gas temperature as a reference to guide the pilot to a fuel-air mixture setting within best power limits of the engine, below this first peak exhaust gas temperature, as specified by the engine manufacturer. In one embodiment the best power limits are 65–85° F. rich of peak exhaust gas temperature. The 1° F. numeric resolution of the Multifunction Display and lean state indications of "Looking for #x to Peak (rich)," where x is the $1^{st}$ cylinder to peak, "Peak Detected (rich)", "Best Power", and "Rich of Best Power" provide the pilot with information with which to operate the engine.

For best economy, the Lean Assist routine 102 provided by the Multi Function Display System 100 uses the last cylinder to reach peak exhaust gas temperature as a reference to guide the pilot to a mixture setting within the best economy limits of the engine, below the last cylinder peak temperature, as specified by the engine manufacturer. In one embodiment, the best economy limits are 25–50° F. lean of peak exhaust gas temperature. The 1° F. numeric resolution of the Multifunction Display 106 and Lean State indications of "Last Peak Detected", "Best Economy", and "Too Lean" provide the pilot with information with which to operate the engine.

The well-balanced fuel/air ratios result in minimal fuel flow spread between leanest to richest cylinder peak exhaust gas temperature, allowing for smooth engine operation within the Best Economy range indicated by the Multi Function Display.

FIG. 4 is described in conjunction with the engine page (screen view) of FIG. 3 as displayed on the display 106 (FIG. 1).

At step 400, the system 100/Routine 102 (FIG. 1) checks if the Lean Assist button 228 (FIG. 3) has been pressed indicating that the pilot wishes to set the optimum fuel mixture. If so, processing proceeds to step 402. The pilot typically presses the Lean Assist button 228 after cruise power has been established.

At step 402, when the Lean Assist button 288 (FIG. 3) is pressed, the system 100/Routine 102 (FIG. 1) begins monitoring the Exhaust Gas Temperature (EGT) of all cylinders, looking for the first cylinder "to peak", that is, to reach a peak EGT, as the pilot "leans the mixture", that is, reduces the fuel flow in the mixture.

At step 404, the system/routine checks if any of the cylinders has reached peak EGT. When the first cylinder to peak (the leanest cylinder) is detected, processing continues with step 406. If the first cylinder to peak has not yet been detected, the system continues at step 402 to monitor the EGT of all cylinders.

At step 406, as, for example, cylinder #5 peaks, the display 106 annunciates "Peak Detected" and the bar graph corresponding to the #5 cylinder bar changes color from green to cyan. The first cylinder to peak is tagged "$1^{st}$". At this point the pilot can begin to richen the mixture, that is, increase the fuel flow or continue to lean the mixture, that is, decrease the fuel flow. The system (routine 102) monitors the fuel flow to determine whether the pilot is leaning or enriching. The pilot has the option to increase the richness of the mixture or operate lean of peak, which can result in significant fuel savings and cooler engine temperatures. The automatic transition to Best Power leaning can occur at any point after detection of the first cylinder to reach a peak EGT, when the system (routine) detects an increase in fuel flow. When leaning for best power, the final mixture setting is based on the first cylinder to reach peak EGT. If the system/routine detects that the pilot is beginning to increase fuel flow, that is, the pilot is enriching, processing continues with step 408 to set the optimum fuel flow for best power. If the system/routine detects that the pilot is decreasing fuel flow, that is, the pilot is leaning, processing continues with step 426 to set the optimum fuel flow for best economy.

At step 408, as the pilot enriches for best power, the system/routine monitors the EGT of the original first cylinder to peak (the one tagged "$1^{st}$") and looks for it to peak again. As the mixture is richened, that is, the fuel flow is increased, the display 106 first annunciates "Looking for #5 to Peak (Rich)".

At step 410, if the pilot continues to enrich, the EGT of the first cylinder to reach peak EGT will reach a second peak temperature (near the initial peak temperature), that is, the EGT will increase toward the initial peak temperature. Upon detecting the second peak temperature, processing continues with step 412.

At step 412, the system/routine 102 checks if the fuel flow is decreasing. If so, processing continues with step 402 to switch to set the optimum fuel flow for best economy and search for the first cylinder to peak. If not, processing continues with step 414 to continue to set the optimum fuel flow for best power.

At step 414, the system/routine continues to monitor the EGT of the first cylinder to peak as the fuel flow is increased. The EGT of the cylinder will begin to decrease as the fuel flow is increased.

At step 416, the system/routine checks if the EGT of the cylinder has dropped to within the best power limit of the engine as specified by the engine manufacturer. In one embodiment, the EGT for that cylinder is within the best power limit when it is between 65° F. and 85° F. less than the peak EGT. Thus, the best power temperature range is 65° F. and 85° F. less than the peak EGT, with an upper best power limit temperature of 65° F. and a lower best power limit temperature of 85° F. Once the EGT of the cylinder is within the best power limit, the display 106 annunciates "Peak Detected (Rich)" after it determines the peak EGT and processing continues with step 418.

At step 418, the fuel flow is set for the best power, the system 100 annunciates "Best Power" (the optimum best power mixture has been achieved.) When leaning is complete, the pilot exits Leaning Mode (function 102) with the Absolute or Normalize buttons 280, 290 (FIG. 3). Normalize rescales the EGT bar graphs so changes are easily apparent.

At step 420, the system checks if the EGT of the first cylinder has dropped below the best power limit of the engine. In one embodiment, the best power limit is 85° F. below peak EGT. If so, the fuel flow is no longer set for best power and processing continues with step 422. If not, the fuel flow is still set for best power and processing continues with step 422.

At step 422, the system checks if the EGT of the first cylinder to peak is less than 65° F. rich of peak. If so, processing continues with step 412 to determine if the fuel flow is decreasing and the system should switch to setting optimum fuel flow for best economy. If not, processing continues with step 424.

At step 424, the display 106 annunciates "Rich of Best Power." The pilot can lean the engine back to decrease the fuel flow until the EGT is within the best power limit. Once the EGT is within the best power limit, the system 100/routine 102 switches back into the best power mode at step 418. After the desired engine lean setting is achieved, the pilot presses the "Normalize" or "Absolute" button 290, 280 to exit the "Lean Assist" function 102.

Figure 5:
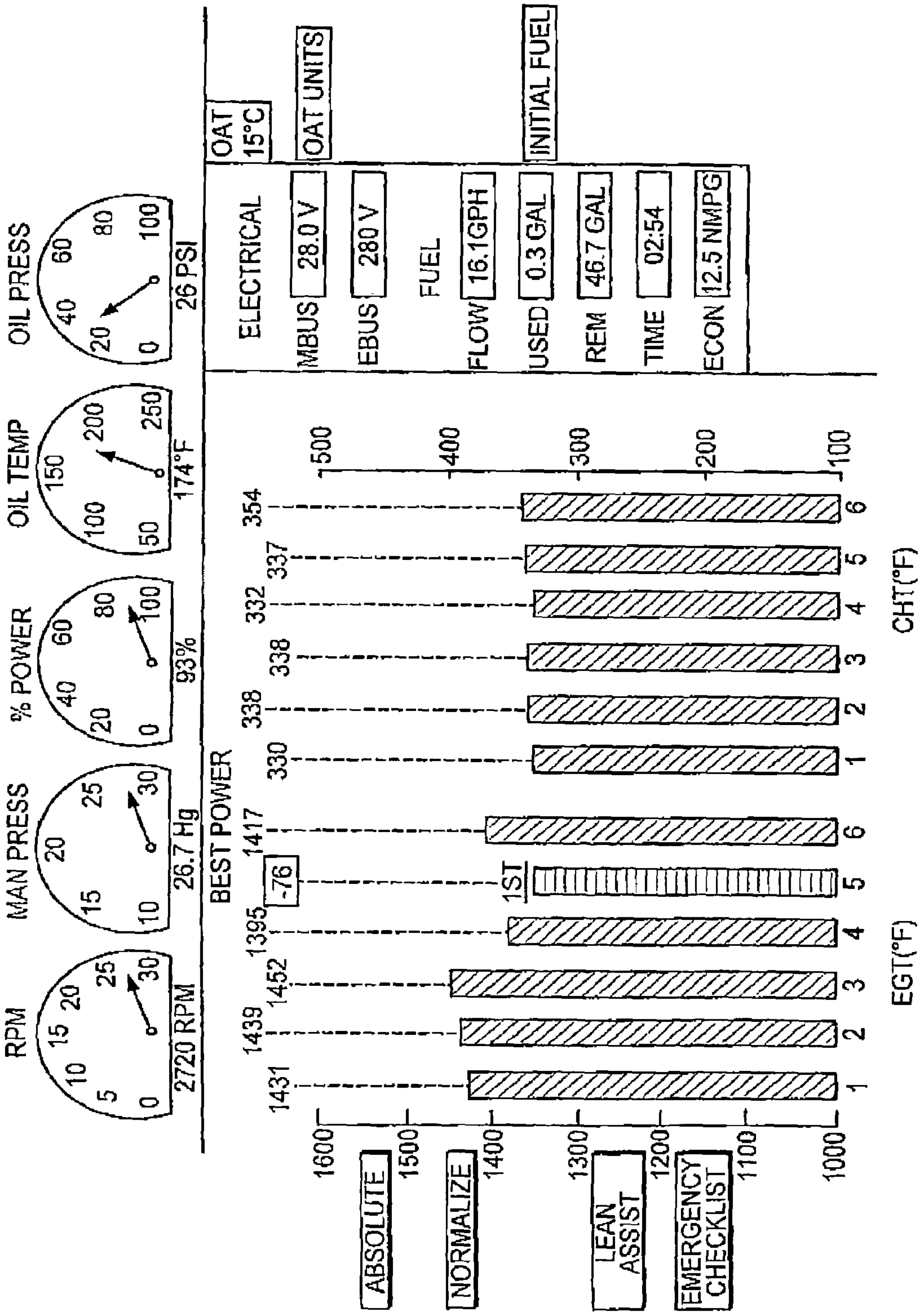
FIG. 5 illustrates the engine page (screen view) shown in FIG. 3 after the best power has been achieved.

FIG. 5 illustrates the engine page shown in FIG. 3 after fuel flow has been set for the best power. The text "Best Power" appears above the bar graph. The text "1st" appears over the bar representing cylinder #5, the color of which has been changed from green to cyan. The numeric representation "−76", indicates that the EGT of cylinder #5 is 76° F. less than peak temperature.

Continuing with FIG. 4, in order to lean the engine for best economy, at step 400, the pilot presses the "Lean Assist" button 288 and smoothly leans the mixture control, that is, reduces the fuel flow to the engine.

At step 402, the MFD annunciates "Looking for First Peak" at the top of the temperatures section 236 of the display 106 page (screen view). The system/routine begins monitoring all cylinders, looking for the first one to reach peak EGT. As the exhaust gas temperatures increase the first cylinder reaches peak EGT.

At step 404, the display 106 annunciates "First peak detected" and the color of the bar corresponding to the 1st cylinder to peak is changed from green to cyan. The pilot slowly leans the mixture, that is, reduces the fuel flow.

At step 406, the system/routine detects that the mixture is being decreased and processing continues with step 422 to set the optimum fuel flow for best economy.

At step 426, the system/routine monitors the EGT of all of the cylinders looking for each cylinder to reach peak EGT. The second cylinder reaches a peak EGT and the pilot continues to slowly lean the mixture. After the third cylinder peaks, the annunciation changes to "Looking for Last Peak." When leaning for best economy, the final mixture setting is based on the last cylinder to reach a peak EGT.

At step 428, the system/routine monitors the EGT of the last cylinder. As the pilot leans the mixture further, the last cylinder eventually peaks, and the MFD 100 annunciates "Last Peak Detected."

At step 430, the system checks if the fuel flow is increasing. If so, the pilot is enriching and processing continues with step 408 to set the optimum fuel flow for best power. If not, the pilot is leaning and processing continues with step 432 to set the optimum fuel flow for best economy.

At step 432, the pilot continues leaning the mixture, the last cylinder to peak continues to cool. The system/routine monitors the EGT of the last cylinder as the mixture is leaned.

At step 434, the system/routine checks whether the EGT of the last cylinder to peak is below the best economy limit. In one embodiment, the best economy limit is when the temperature for the last cylinder to reach peak EGT is between 25° F. and 50° F. lean of (below) peak. If so, processing continues with step 436.

At step 436, the MFD 100 annunciates "Best Economy" which indicates that the best economy mixture has been achieved.

At step 440, the system/routine continues to monitor the EGT of the last cylinder to peak. If the temperature drops below 50° F. lean of peak, the optimum fuel flow is no longer set for best economy. The system 100/routine 102 detects this condition and annunciates "Too Lean". This means that, if the pilot continues leaning, the engine will eventually run rough.

At step 442, the system checks if the EGT of the last cylinder to peak is less than 25° F. lean of peak. If so, processing continues with step 430 to determine if the fuel flow is increasing to determine if a switch to searching for "best power" is necessary. If not, processing continues with step 444 to continue to set the optimum fuel flow for best economy.

At step 444, the pilot enriches the mixture, that is, increases the fuel flow. At step 440, upon detecting that the EGT is at 50° F. lean of peak, the system 100/routine 102 changes back to "Best Economy" at step 436 and, if the pilot continues to enrich the mixture beyond 25° F. lean of peak, at step 442 the system 100/routine 102 will switch into Best Power mode.

When leaning is complete, the pilot exits Leaning Mode with the Absolute or Normalize buttons 280, 290. Normalize rescales the EGT bar graphs so changes are easily apparent.

Figure 6:
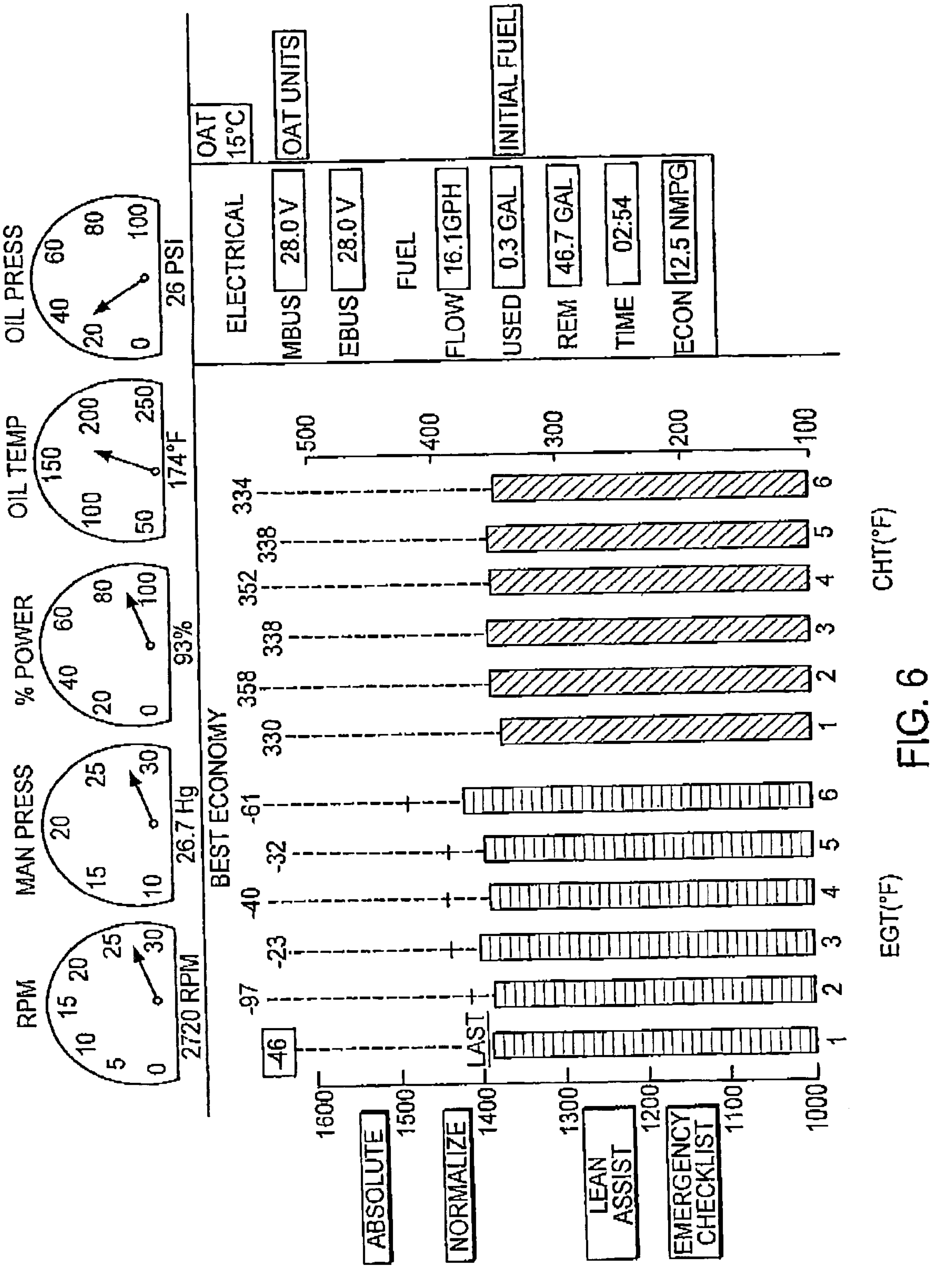
FIG. 6 illustrates the engine page (screen view) shown in FIG. 3 after the best economy has been achieved.

FIG. 6 illustrates the engine page shown in FIG. 3 after the best economy has been achieved. The text "Best Economy" appears above the bar graph. The text "last" appears over the bar representing cylinder #1, for example, the last cylinder to peak. The color of all the bars corresponding to EGT has been changed from green to cyan as each of the EGTs peaked. The numeric representation above each bar indicates that the EGT temperature is below the peak EGT.

Accordingly, with the lean assist function 102 and MFD system 100 of the present invention operated as described above and in FIGS. 1–6, a pilot can easily lean the aircraft engine for best economy or best power. Consequently, the complicated process of the prior art is advantageously replaced by the present invention method and system.

Figure 7:
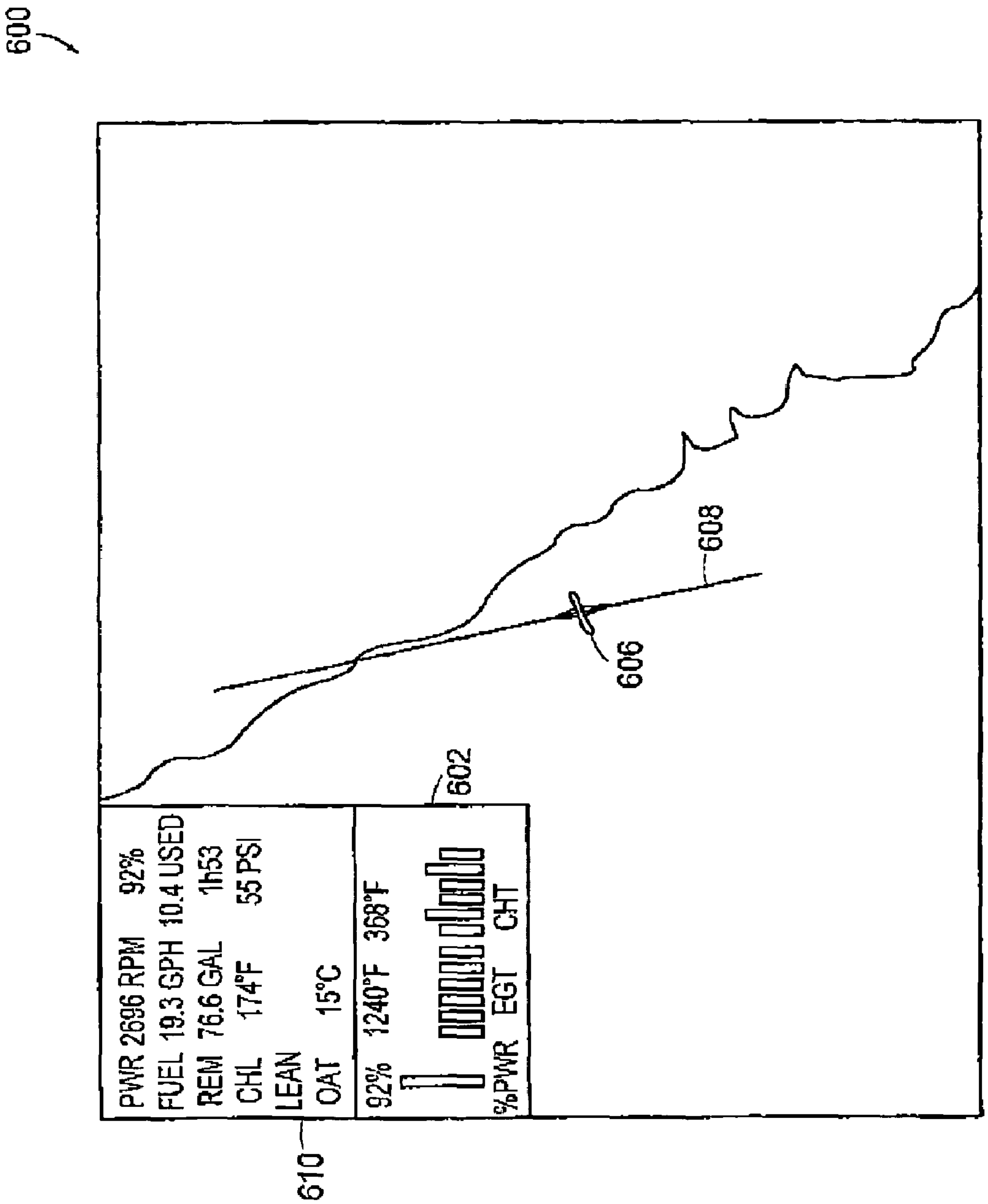
FIG. 7 illustrates a map page (screen view) including a data block providing engine parameters in the system of FIG. 1.

FIG. 7 illustrates a map page 600 including data blocks 610, 602 providing engine parameters. The map page 600 shows the terrain, the position of the aircraft 606 and the flight path 608. During normal cruise operation the pilot displays the engine parameters on the Map page 600 to monitor the engine parameters. In the present invention, the Map Page 600 includes data blocks which provide additional information to the pilot. The Lean State Data Block 610 indicates the Lean Assist Leaning State of "Best Power", "Best Economy", or indicates a change in fuel flow or power. The Lean State Data Block 610 indicates "Economy" or "Power" when the lean assist procedure 102 is completed. The Lean State Data Block 610 indicates "Leaning . . . " when the pilot switches back to the map page 600 before the lean assist mode was exited (that is, during lean assist function in-progress). The Lean State Data Block 610 indicates "Incomplete" when the lean assist mode is exited prior to achieving best power or best economy. The Lean State Data Block 610 indicates "FF Change" when the lean state (i.e. "Economy" or "Power") is no longer valid due to a fuel flow adjustment. The Lean State Data Block 610 indicates "Power Change" when the lean state is no longer valid due to a power adjustment.

The indication of a power or fuel flow change informs the pilot that the current fuel flow mixture setting may no longer be valid. If the pilot adjusts the mixture for a change in fuel flow more than 1 gallon per hour, the Lean State "FF Change" is indicated. If the pilot adjusts the power lever for a change of more than 5% Horse Power (HP) (calculated by the MFD 100 based on RPM 206, MAP 208, OAT 202 and FF 226), a Lean State of "Power Change" is indicated.

The engine sensor status box 602 provides textual and graphical representation of the Percent Power, EGT, and CHT. It is positioned below the left data block 610.

For example, in the discussion of FIG. 4, the display 106 is described as "annunciating" certain state information. A visual indication, audible rendering and other ways of providing this information are included in the term "annunciating". Also it is understood that other colors, graphical representations and indicia are suitable.

It will be apparent to those of ordinary skill in the art, that methods involved in the present invention may be embodied in a computer program product that includes a computer usable medium. For example, such a computer usable medium can consist of a read only memory device, such as a hard drive or a computer diskette, having computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer implemented method for optimizing fuel flow while operating an engine comprising the steps of:

upon receiving a request for optimizing fuel flow, monitoring an increase in exhaust gas temperature in a plurality of cylinders in the engine as fuel flow is decreased;

upon detecting a first peak temperature in a first cylinder, identifying the first cylinder on a display, the display showing a graphical representation of measured exhaust gas temperature for each cylinder in the engine;

monitoring the exhaust gas temperature to detect subsequent peak temperatures, the exhaust gas temperatures being monitored dependent on fuel flow after the first cylinder has been identified; and providing an operator with a lean state indication for optimizing fuel flow while the engine is actively providing motorized transportation, the lean state indication being provided to the operator via the display.

2. The method of claim 1 further comprising the steps of:

upon detecting an increase in the fuel flow after identifying the first cylinder, monitoring the exhaust gas temperature of the first cylinder;

upon detecting the exhaust gas temperature in the first cylinder has reached the second peak temperature, monitoring the exhaust gas temperature of the first cylinder until the exhaust gas temperature is below a temperature range of the second peak temperature; and indicating on the display that the fuel flow for best power has been reached.

3. The method of claim 2 wherein the temperature range is within best power limits of the engine below the second peak temperature.

4. The method of claim 3 wherein upon detecting that the exhaust gas temperature is below an upper best power limit temperature of the second peak temperature, indicating on the display that the fuel flow is rich of peak.

5. The method of claim 1 further comprising the steps of:

upon detecting a decrease in the fuel flow after identifying the first cylinder, monitoring the exhaust gas temperature of the other cylinders;

upon detecting the exhaust gas temperature in a last cylinder has reached a last peak temperature, monitoring the exhaust gas temperature of the last cylinder until the exhaust gas temperature is below a temperature range of the last peak temperature; and indicating on the display that the fuel flow for best economy has been reached.

6. The method of claim 5 wherein the temperature range is within best economy limits of the engine below the last cylinder peak temperature.

7. The method of claim 6 wherein upon detecting that the exhaust gas temperature is below a lower best economy limit of the last cylinder peak temperature, indicating on the display that the fuel flow is too lean.

8. The method of claim 1 wherein the display includes a numeric representation of the exhaust gas temperature for each cylinder.

9. The method of claim 8 wherein the resolution of the numeric representation is one degree Fahrenheit.

10. An engine status display system comprising:

a computer executed lean assist routine which (a) upon receiving a request for optimizing fuel flow, monitors an increase in exhaust gas temperature in a plurality of cylinders in the engine as fuel flow is decreased, (b) upon detecting a first peak temperature in a first cylinder, identifies the first cylinder on a display and monitors the exhaust gas temperature to detect subsequent peak temperatures, the exhaust gas temperature being monitored dependent on the fuel flow provided after the first cylinder has been identified, and (c) provides an operator with a lean state indication for optimizing fuel flow while the engine is actively providing motorized transportation; and a display which shows a graphical representation of measured exhaust gas temperature for each cylinder in the engine and provides the lean state indication that an optimum fuel flow has been detected by the lean assist routine.

11. The display system of claim 10 wherein the lean assist routine further comprises:

(c) upon detecting an increase in the fuel flow after identifying the first cylinder, monitors the exhaust gas temperature of the first cylinder;

(d) upon detecting the exhaust gas temperature in the first cylinder has reached the second peak temperature, monitors the exhaust gas temperature of the first cylinder until the exhaust gas temperature is below a temperature range of the second peak temperature; and (e) indicates on the display that the fuel flow for best power has been reached.

12. The display system of claim 11 wherein the temperature range is within best power limits of the engine below the second peak temperature.

13. The display system of claim 12 wherein upon detecting that the exhaust gas temperature is below an upper best power limit temperature, indicating on the display that the fuel flow is rich of peak.

14. The display system of claim 10 further comprising the steps of:

upon detecting a decrease in the fuel flow after identifying the first cylinder, monitoring the exhaust gas temperature of the other cylinders;

upon detecting the exhaust gas temperature in a last cylinder has reached a last peak temperature, monitoring the exhaust gas temperature of the last cylinder until the exhaust gas temperature is below a temperature range of the last peak temperature; and indicating on the display that the fuel flow for best economy has been reached.

15. The display system of claim 14 wherein the temperature range is within the best economy limits of the engine below the last cylinder peak temperature.

16. The display system of claim 15 wherein upon detecting that the exhaust gas temperature is below a lower best economy limit, indicating on the display that the fuel flow is too lean.

17. The display system of claim 10 wherein the display includes a numeric representation of the exhaust gas temperature for each cylinder.

18. The display system of claim 17 wherein the resolution of the numeric representation is one degree Fahrenheit.

19. An apparatus for optimizing fuel flow while operating an engine comprising:

upon receiving a request for setting the optimum fuel flow, means for monitoring an increase in exhaust gas temperature in a plurality of cylinders in the engine as fuel flow is decreased;

upon detecting a first peak temperature in a first cylinder, means for identifying the first cylinder on a display, the display showing a graphical representation of measured exhaust gas temperature for each cylinder in the engine;

means for monitoring the exhaust gas temperature to detect subsequent peak temperatures, the exhaust gas temperatures being monitored dependent on fuel flow after the first cylinder has been identified; and means for providing an operator with a lean state indication for optimizing fuel flow while the engine is actively providing motorized transportation, the lean state indication being provided to the operator via the display.

20. A computer program product for optimizing fuel flow while operating an engine, the computer program product comprising a computer usable medium having computer readable code thereon, including program code which:

upon receiving a request for optimizing fuel flow, monitoring an increase in exhaust gas temperature in a plurality of cylinders in the engine as fuel flow is decreased;

upon detecting a first peak temperature in a first cylinder, identifying the first cylinder on a display, the display showing a graphical representation of measured exhaust gas temperature for each cylinder in the engine;

monitoring the exhaust gas temperature to detect subsequent peak temperatures, the exhaust gas temperatures being monitored dependent on fuel flow after the first cylinder has been identified; and providing an operator with a lean state indication for optimizing fuel flow while the engine is actively providing motorized transportation, the lean state indication being provided to the operator via the display.

21. A computer implemented method for optimizing fuel flow while operating a device having an engine comprising the steps of:

upon receiving a request for optimizing fuel flow, monitoring an increase in exhaust gas temperature in a plurality of cylinders in the engine as fuel flow is decreased;

upon detecting a first peak temperature in a first cylinder, identifying the first cylinder on a display, the display showing a graphical representation of measured exhaust gas temperature for each cylinder in the engine;

monitoring the exhaust gas temperature to detect subsequent peak temperatures, the exhaust gas temperatures being monitored dependent on fuel flow after the first cylinder has been identified; and providing an operator of the device with a lean state indication for optimizing fuel flow while the device is actively performing its function, the lean state indication being provided to the operator via the display.

* * * * *